United States Patent Office 3,384,161
Patented May 21, 1968

3,384,161
COOLERS FOR MIXTURES OF GASES AND SOLID PARTICLES
Lennart Hugo Malmstrom and Carl Olof Malmstrom, Norrkoping, Sweden, assignors to Svenska Carbon Black Aktiebolag, Sjotullsgatan, Norrkoping, Sweden, a Swedish company
Filed Feb. 8, 1966, Ser. No. 525,988
7 Claims. (Cl. 165—94)

ABSTRACT OF THE DISCLOSURE

A tubular cooler for a mixture of gas and carbon black particles is provided, which comprises a bank of vertical tubes through which the mixture passes, means for cooling the outsides of the tubes, chambers above and below the bank for the inflow and outflow of the mixture, a scraper fitting inside each tube contacting the tube wall at a number of equally spaced co-planar points but allowing free passage of gas and particles through the tubes, a plate located within the upper chamber from which the scrapers are suspended, a vertical rod, fixed to the plate, passing through a gas tight aperture in the roof of the upper chamber, and means for reciprocating the assembly of rod, plate, and scrapers, the stroke of reciprocation being equal to the distance between the equally spaced co-planar points at which the scrapers contact the tube walls.

---

This invention relates to coolers for mixtures of gases and solid particles, particularly the products of carbon black producing processes.

The cooling of mixtures of gases and solid particles, particularly the cooling of the mixtures from high temperatures of 600° C. or more to temperatures below 300° C., is a matter of considerable commercial interest particularly in the production of carbon black by the furnace process. The present practice is to cool the gas-solids mixture by direct injection of water. While this gives the required cooling quickly it has a number of important drawbacks. For example, the solid particles are wetted and usually have to be dried again before collection. Corrosion of the apparatus downstream of the cooler is also increased. Further the gases become admixed with large quantities of water vapour, which reduce their value as fuel gas. But perhaps most importantly of all, the water vapour tends to react with the carbon black particles to form water gas and reduce the overall yield of carbon black. To overcome these drawbacks, it has been proposed to cool the mixtures by indirect heat exchange, but the difficulty with this method is the fact that the solid particles are deposited on the walls of the heat exchanger and quickly reduce the heat transfer through the walls.

The object of the present invention is to prevent the build-up of deposits on the walls of tubular coolers.

According to the present invention, therefore, a tubular cooler for mixtures of gases and solid particles comprises one or more tubes though which the mixture can pass, means for cooling the outside of the tube, and a scraper fitting inside the tube which contacts the tube wall but allows free passage of gas and particles through the tube and which is capable of reciprocating axially in the tube, said scraper being in contact with the tube wall at a number of equally spaced points and being capable of being reciprocated with a stroke at least equal to the distance between the equally spaced points.

Preferably a number of tubes are arranged in a bank and each tube or bank of tubes are vertical. Preferably the tube or bank of tubes are surrounded by an enclosed shell having an inlet and outlet for cooling fluid. Cooling by a liquid, such as water, is preferred, but cooling of at least a portion of the length of the tubes by a gas is not excluded. Where gas cooling is used, the outside of the tubes are preferably finned or have some other form of extended surface.

The invention is illustrated without being limited by the accompanying drawings in which.

Figure 1:
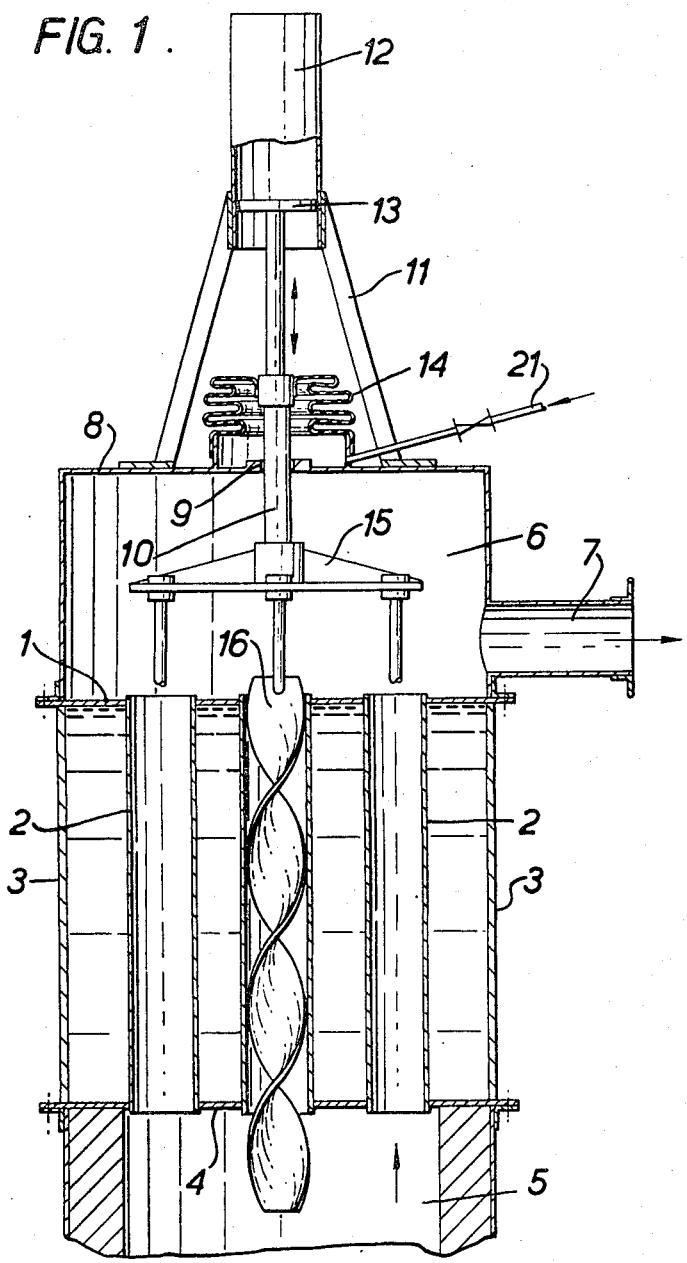
FIGURE 1 shows a tube cooler according to the present invention.

In the drawings, a tube cooler has a number of parallel, straight, preferably vertical tubes 2. These are fixed into two parallel end plates 1, 4, which are fixed over the ends of a preferably cylindrical casing 3, which is arranged so that a cooling fluid, preferably water, flows through it via an inlet and outlet (not shown).

The lower end plate 4 is connected to a chamber 5, through which hot gas containing solid particles is supplied to the tubes 2, and the upper end plate 1 is connected to a chamber 6, from which the cooled gas and particles exit through a connecting branch 7. The chamber 6 is closed at its upper end by a roofing slab 8, which has a central opening 9.

A rod 10 is arranged to pass through the opening 9 with slight play. A support 11, resting on the roofing slab 8, holds the upper end of rod 10 in such a way that it is free to reciprocate longitudinally.

In the design shown this arrangement consists of a piston 13 axially movable in a cylinder 12, by fluid pressure applied alternately to either side. The arrangement in question can naturally be designed in many other ways, e.g. as a crank and connecting rod.

A bellows 14 is fixed to the rod 10 and the roof slab 8 so that no gas can leak through the opening 9.

Figure 2:
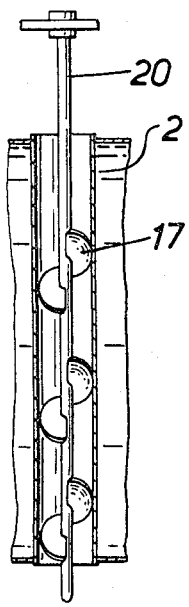
FIGURES 2 to 4 show alternative forms of scraper for use with the present invention.
Figure 3:
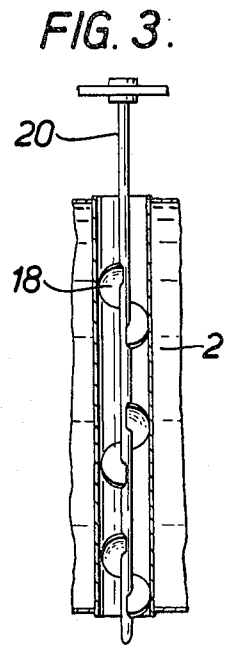
Figure 4:
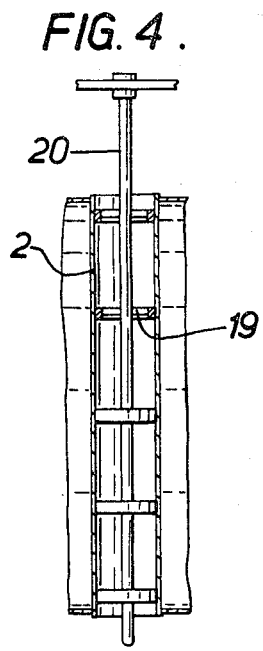

The rod 10 is fastened with its lower end to a transverse plate 15, from which scrapers 16, 17, 18, 19 are suspended passing through each of the tubes 2. In the design illustrated on FIG. 1 the scrapers consist of a helically wound flat steel bar 16. The stroke of the piston 13 is at least equal to the length of the helix. In the design according to FIGS. 2 and 3, the scrapers consist of screw-shaped bent plates 17, 18 fixed to a central rod 20. In FIG. 2 all these plates 17 are bent in the same direction, whilst plates 18 in FIG. 3 are alternately right-hand and left-hand twisted. In FIG. 4 the scrapers consist of scraping rings 19 fixed to a central rod 20, for example by means of hubs and spokes. The stroke of the piston 13 is greater than the distance between adjacent scrapers 17, 18, 19.

It is advantageous to blow in cooled, particle free gas into the bellows 14 through a pipe 21, in a quantity which is per unit of time, at least as large as the simultaneous increase of the volume of bellows 14 during the upward stroke of the piston 13. This gas is preferably injected at the bottom of the bellows.

The apparatus described above may be used for cooling any mixtures of gases and solid particles, and, although particularly suitable for cooling the products of a carbon black producing process, is not limited thereto. The invention thus includes a method of cooling mixtures of gases and solid particles comprising passing the mixture through one or more tubes which are cooled externally and preventing the deposition of the solid particles on the internal walls of the tube by reciprocating a scraper axially within the tube, said scraper, while allowing free passage of gas and particles through the tube, being in contact with the wall of the tube at a number of equally spaced points and the stroke of the reciprocating scraper being at least equal to the distance between the equally spaced points.

Preferably the mixture of gas and solid particles is the product from a carbon black producing process. As is well known carbon black is produced by the incomplete combustion of hydrocarbons with an oxygen containing gas, such as air, under turbulent conditions. The product mixture is thus carbon black in the form of very fine particles, together with a gas containing unburnt or partially burnt hydrocarbons, carbon oxides, hydrogen and nitrogen, if air is used as the combustion gas. The fine state of subdivision of the carbon black makes the product particularly suitable for cooling by the method and apparatus of the present invention and, as stated earlier, there are particular advantages resulting from the use of the present invention in carbon black manufacture in that the carbon black yield is increased, the carbon black is not wetted, corrosion downstream from the cooler is reduced by the absence of water vapour and the gaseous by products are more valuable.

Preferably the tube or tubes are placed vertically and the mixture of gas and solid particles flows upwardly. The rate of flow of the mixture should be such that the solid particles are kept in suspension and pass out of the cooler with the gases for separation and collection at a later point.

The apparatus and method of the present invention are particularly suitable for use in combination with the invention described in applicants' Swedish patent application No. 3,320/65.

The invention is illustrated by the following example.

Example

A fuel oil having a density at 20° C. of 0.941, a viscosity at 100° F. of 146 centistokes and a carbon/hydrogen weight ratio of 8.12 was burned in a furnace supplied with insufficient air for complete combustion at a temperature of 1200° C. to give a mixture of gas and carbon black.

After further reaction of the products in a secondary reactor the product temperature was 850° C. The product was a mixture of carbon black particles and gas of the following compositions:

|  | Percent |
|---|---|
| $CO_2$ | 5.2–6.2 |
| $CO$ | 15.8–17 |
| $H_2$ | 10.7–29.7 |
| $N_2$ | 52–57.5 |

The mixture was then passed to a tubular cooler of the type shown in FIG. 1. The cooler consisted of a bank of mild steel tubes each having a wall thickness of 3 mm. and a total internal surface area of 17.5 m.² The speed of flow of the mixture upwardly through the tubes was 500–850 m.³/hr. Water was passed through the jacket surrounding the tubes at a rate of 4000 litres/hour. The water inlet temperature was 10–20° C. and the outlet temperature 80° C. The mixture of gas and solid particles was cooled to 200–300° C. and passed out of the top of the cooler for separation and collection in conventional manner. During the passage of the mixture the scrapers were reciprocated continuously at a rate of 7 strokes/minute. The cooler was operated continuously for a period of 25 days without any noticeable reduction in the heat transfer rate through the walls of the tube. At the end of the run the tubes were examined visually and found to be free of deposits.

We claim:

1. A tubular cooler for a mixture of gas and carbon black particles comprising a bank of vertical tubes through which the mixture passes, means for cooling the outsides of the tubes, chambers above and below the bank for the inflow and outflow of the mixture, a scraper fitting inside each tube contacting the tube wall at a number of equally spaced vertically co-planar points but allowing free passage of gas and particles through the tubes, a plate located within the upper chamber from which the scrapers are suspended, a vertical rod, fixed to the plate, passing through a gas tight aperture in the roof of the upper chamber, and means for reciprocating the assembly of rod, plate and scrapers, the stroke of reciprocation being at least equal to the distance between the equally spaced co-planar points at which the scrapers contact the tube walls.

2. A tubular cooler as claimed in claim 1 wherein the scraper consists of a helically wound bar capable of reciprocating with a stroke at least equal to the pitch of the helix.

3. A tubular cooler as claimed in claim 1 wherein the scraper consists of a series of pairs of inclined semi-circular plates spaced along a central rod, each pair of plates being inclined so that their circumferences form one complete helix.

4. A tubular cooler as claimed in claim 3 wherein the pairs of plates are inclined in the same way to give helices of the same thread throughout the length of the scraper.

5. A tubular cooler as claimed in claim 3 wherein the pairs of plates are inclined alternately in opposite directions so that the helices are alternately of left-hand and right-hand thread.

6. A tubular cooler as claimed in claim 1 wherein the aperture is made gas-tight by a bellows fixed to the rod and to the roof of the chamber.

7. A tubular cooler as claimed in claim 6 wherein the bellows has an inlet through which cooled gas free from solid particles can be fed.

References Cited

UNITED STATES PATENTS

| 1,528,007 | 3/1925 | Crommett | 23—259.9 |
| 1,770,208 | 7/1930 | Kemnal | 165—95 |
| 3,215,506 | 11/1965 | Keil et al. | 23—285 |
| 3,252,766 | 5/1966 | Chadbourne et al. | 23—284 |
| 3,259,179 | 7/1966 | Leach | 165—95 |

ROBERT A. O'LEARY, *Primary Examiner.*

T. W. STREULE, *Assistant Examiner.*